(12) United States Patent
Prest et al.

(10) Patent No.: US 7,593,715 B2
(45) Date of Patent: Sep. 22, 2009

(54) SYSTEM AND METHOD FOR DETECTING ACTIVITY ON A FREQUENCY BAND

(75) Inventors: Kevin Prest, Los Altos, CA (US); Vinh-Phuong Tra Le, Fremont, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 421 days.

(21) Appl. No.: 11/265,423

(22) Filed: Nov. 2, 2005

(65) Prior Publication Data

US 2007/0099596 A1    May 3, 2007

(51) Int. Cl.
*H04M 1/68* (2006.01)

(52) U.S. Cl. .................. 455/410; 455/411; 455/422.1; 455/266; 370/342

(58) Field of Classification Search .................. 455/410, 455/411, 422.1
See application file for complete search history.

(56) References Cited

U.S. PATENT DOCUMENTS

| 6,760,671 | B1 | 7/2004 | Batcher et al. |
| 2004/0102192 | A1 | 5/2004 | Serceki |
| 2005/0227625 | A1 | 10/2005 | Diener |

*Primary Examiner*—David Q Nguyen

(57) ABSTRACT

Described is a method for detecting activity on a frequency band. A wireless signal of a predetermined radio frequency band is received. The signal is processed into a plurality of subsignals, each subsignal corresponding to a particular radio frequency channel of the band. An energy level of the corresponding subsignal is determined, and, when the energy level is greater than a predetermined level, the corresponding channel is analyzed.

21 Claims, 4 Drawing Sheets

System 10

SYSTEM AND METHOD FOR DETECTING ACTIVITY ON A FREQUENCY BAND

BACKGROUND

In a conventional wireless network, an access point ("AP") may utilize an intrusion-detection system ("IDS") to detect unauthorized use or corruption of the network. For example, a rogue AP may be operating in the network and utilizing a bandwidth allocated to further APs and/or mobile units ("MUs") therein. The AP may initiate the IDS which scans a tuner of the AP across a plurality of radio frequency ("RF") channels, as defined by a wireless protocol (e.g., 802.11). The IDS scans a first channel for a predetermined time before scanning a second channel. The IDS scans through the channels in a predetermined sequence and operates on each channel for the predetermined time. When on the channel, the IDS decodes the activity, and the AP determines whether that activity is authorized. Thus, the IDS identifies activity on a per-channel basis, and while the AP is not tuned to that channel, the unauthorized activity remains undetected. Furthermore, the IDS does not detect activity that is non-802.11 (e.g., cordless phone/speaker) which may contribute to interference in the network.

SUMMARY OF THE INVENTION

The present invention relates to a method for detecting activity on a frequency band. A wireless signal of a predetermined radio frequency band is received. The signal is processed into a plurality of subsignals, each subsignal corresponding to a particular radio frequency channel of the band. An energy level of the corresponding subsignal is determined, and, when the energy level is greater than a predetermined level, the corresponding channel is analyzed.

DETAILED DESCRIPTION

Figure 1:
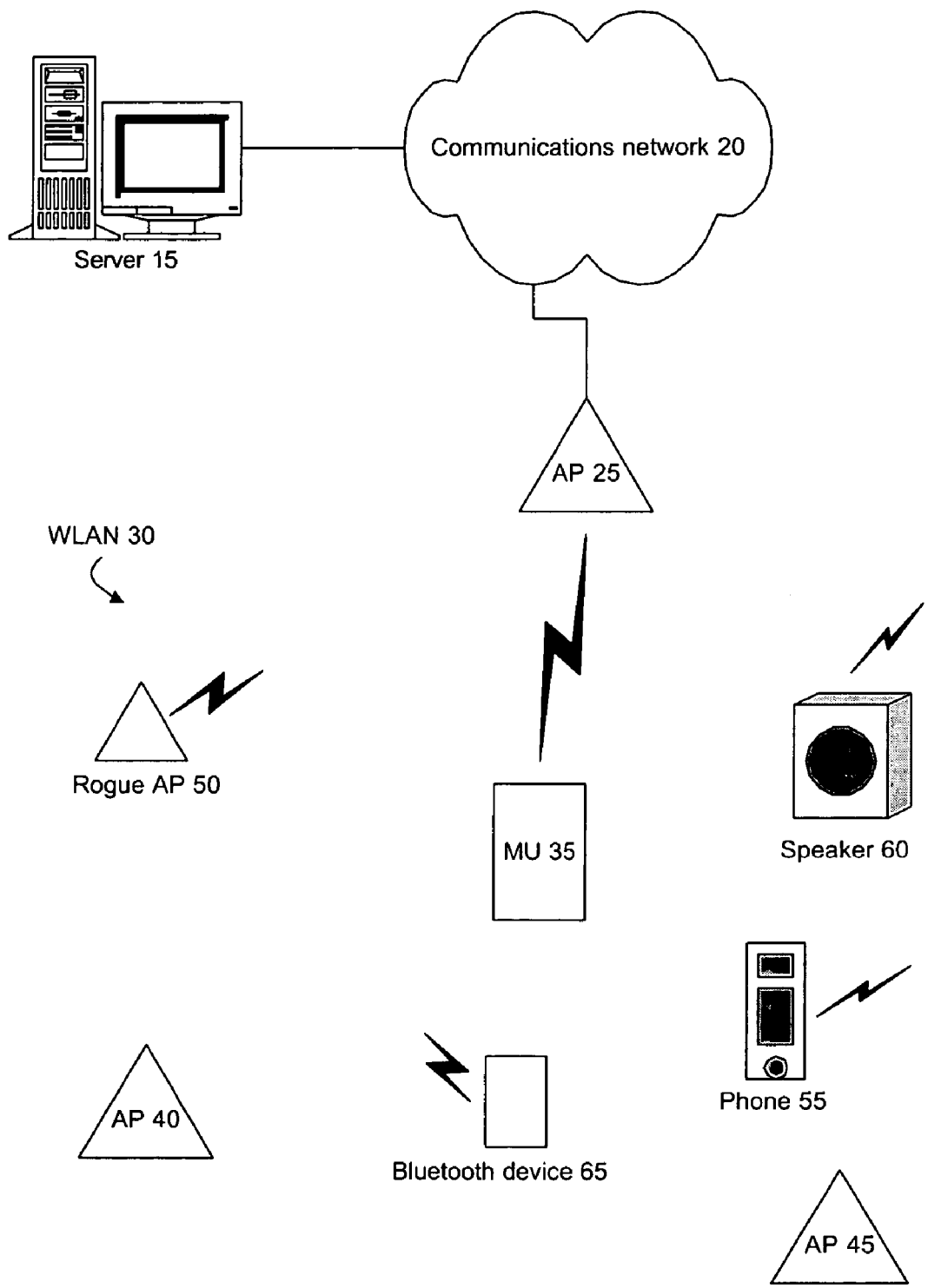
FIG. 1 shows an exemplary embodiment of a system according to the present invention.

The present invention may be further understood with reference to the following description and the appended drawings, wherein like elements are referred to with the same reference numerals. The present invention describes a system and a method for detecting activity on a frequency band. The frequency band may be, for example, a 2.4 GHz band and/or a 5.1 GHz band which are conventionally used for wireless communications in a wireless network. However, those of skill in the art will understand that the present invention may be applied to further frequency bands in a radio frequency ("RF") spectrum.

FIG. 1 shows an exemplary embodiment of a system 10 according to the present invention. The system 10 may include a server 15 coupled to a communications network 20 (e.g., LAN, WAN, Internet, etc.). The server 15 may include a data storage arrangement and/or be coupled to a stand-alone database (not shown). The network 20 may include one or more network computing devices (e.g., a switch, a router, a hub, etc.) which transmit, receive and process data requests from devices coupled to the network 20.

An access point ("AP") 25 is coupled to the network 20. The access point 25 may be one exemplary device operating in a wireless network (e.g., a wireless local area network ("WLAN") 30). For example, a mobile unit ("MU") 35 may be associated with the AP 25 and communicate therewith according to a predetermined wireless communication protocol (e.g., an 802.11 protocol). Those of skill in the art will understand that the MU 35 may be a cell phone, a laptop, a network interface card, an image/laser-based scanner, an RFID reader/tag, etc.

Further included in the WLAN 30 may be APs 40 and 45 which also communicate according to the predetermined wireless communication protocol. As understood by those of skill in the art, the AP 25 may communicate with the MU 35 on a first channel, whereas the APs 40 and 45 operate on a second channel and a third channel, respectively. This is typically done so that communication between the MU 35 and the AP 25 does not cause interference on the second and third channels, because the APs 25, 40 and 45 may be in a predetermined range relative to each other whereby operation on a same channel (e.g., the first channel) may cause interference, congestion, etc. As understood by those of skill in the art, channels utilized by the APs may be selected from a predetermined number of channels. For example, in the United States, the predetermined number is 11 (e.g., channels 1-11), whereas, in Europe, the predetermined number is 13 (e.g., channels 1-13).

According to the present invention, each of the APs 25, 40 and 45 may utilize an intrusion-detection system ("IDS"). For example, the IDS may scan a tuner in the AP 25 across the predetermined number of channels. While the tuner is tuned to a particular channel, the IDS may decode any signals thereon which conform to the predetermined wireless protocol.

Disposed within a physical area covered by the WLAN 30 may be one or more devices which are unauthorized to access the WLAN 30 and/or cause corruption/interference during operation thereof. For example, as shown in FIG. 1, a rogue AP 50 may be an unauthorized device on the WLAN 30 which may use a bandwidth dedicated to the WLAN 30 and/or be a malicious device attempting to compromise a security of the WLAN 30. The rogue AP 50 may operate on a fourth channel, which may be any one of the predetermined number of channels. The present invention provides for the detection of the rogue AP 50.

Figure 2:
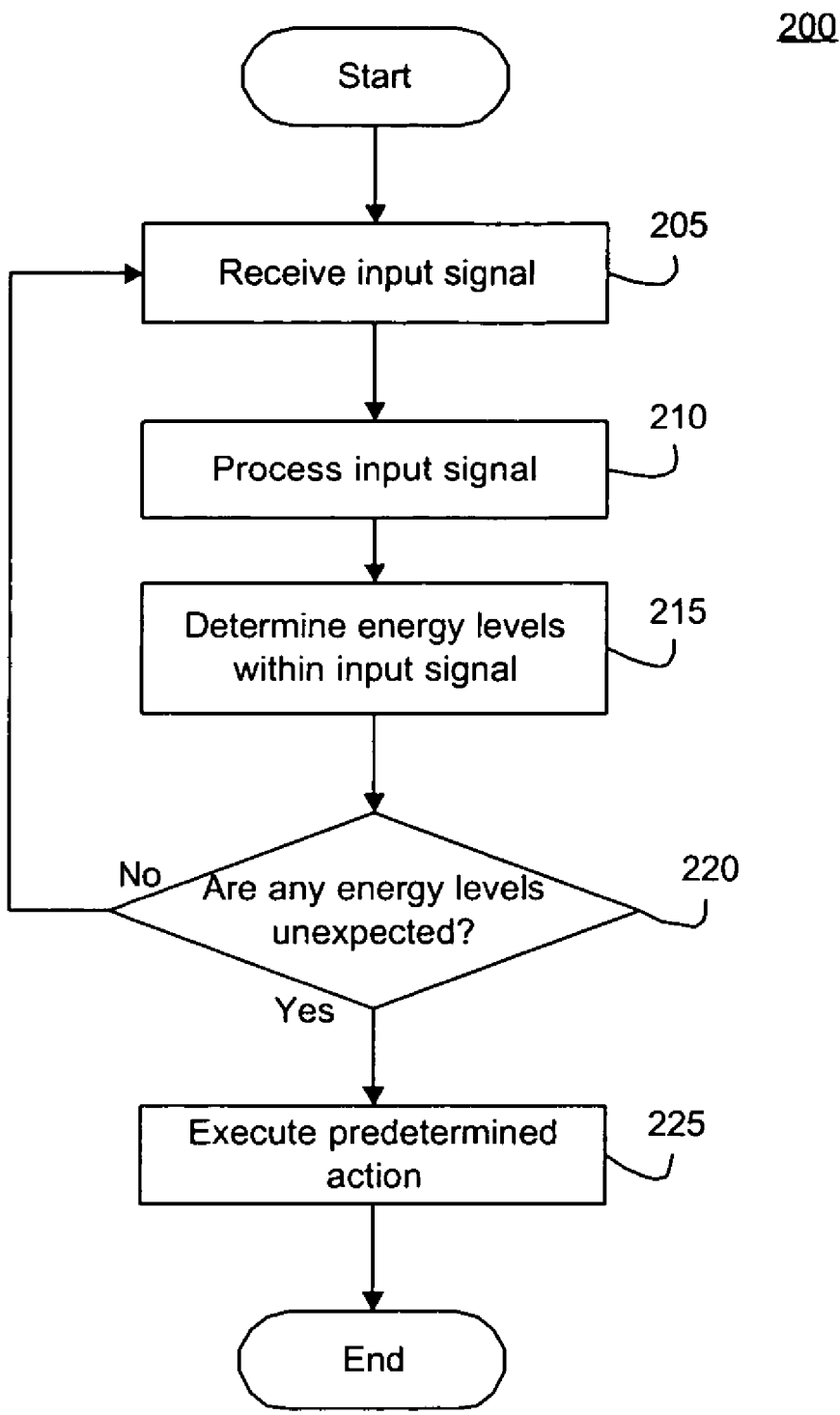
FIG. 2 shows an exemplary embodiment of a method according to the present invention.

FIG. 2 shows an exemplary embodiment of a method 200 for detecting activity on the frequency band according to the present invention. From an analysis of the frequency band, it may be determined whether any unauthorized device is transmitting signals within the WLAN 30. If so, a predetermined action may be taken with respect thereto, and, optionally, a location of the device(s) may be determined.

In step 205, the AP 25 receives an input signal. In one exemplary embodiment, the input signal is an entire frequency band. For example, the input signal may have a predetermined width (e.g., 80 MHz, 20 MHz) which would take in the entire frequency band (e.g., a 2.4 GHz band). That is, according to the predetermined wireless protocol, up to 14 channels may be utilized. Between channel 1 and channel 14 is about 72 MHz. Thus, the 80 MHz may encompass activity on all of the channels 1-14. According to the present invention, the AP 25 and every other AP in the WLAN 30 may utilize a chipset which allows the corresponding AP to receive the entire frequency band. Those of skill in the art will understand that the chipset may allow the AP 25 to receive the entire frequency band of the 5.1 GHz band and any other frequency band in the RF spectrum. In operation, the AP 25 may continuously receive the input signal.

In step 210, the AP 25 processes the input signal using, for example, a signal processing technique (e.g., a Fast Fourier Transform ("FFT")). The FFT may be executed on the input signal at a predetermined interval (e.g., every 5 ms). The FFT divides the input signal into a predetermined number of bins having a predetermined resolution. Each bin includes a portion of the input signal as wide as the predetermined resolution. For example, if the input signal is 80 MHz wide and is divided into 64 bins, each bin will have a resolution of 1.25 MHz. Thus, the portion of the signal in each bin may be 1.25 MHz wide.

In step 215, an energy level of each bin is determined by analyzing a predetermined characteristic (e.g., an amplitude) of the portion of the signal therein. For example, the amplitude of the portion of the signal may be indicative of the energy level thereof. Those of skill in the art will understand that the energy level may be directly proportional to an activity level generated by a source of that portion of the signal. For example, when the rogue AP 50 is transmitting wireless signals, the energy level may be greater than when the rogue AP 50 is idle. Thus, the bin which corresponds to the activity of the rogue AP 50 may exhibit an increased and/or non-zero energy level.

Figure 3:
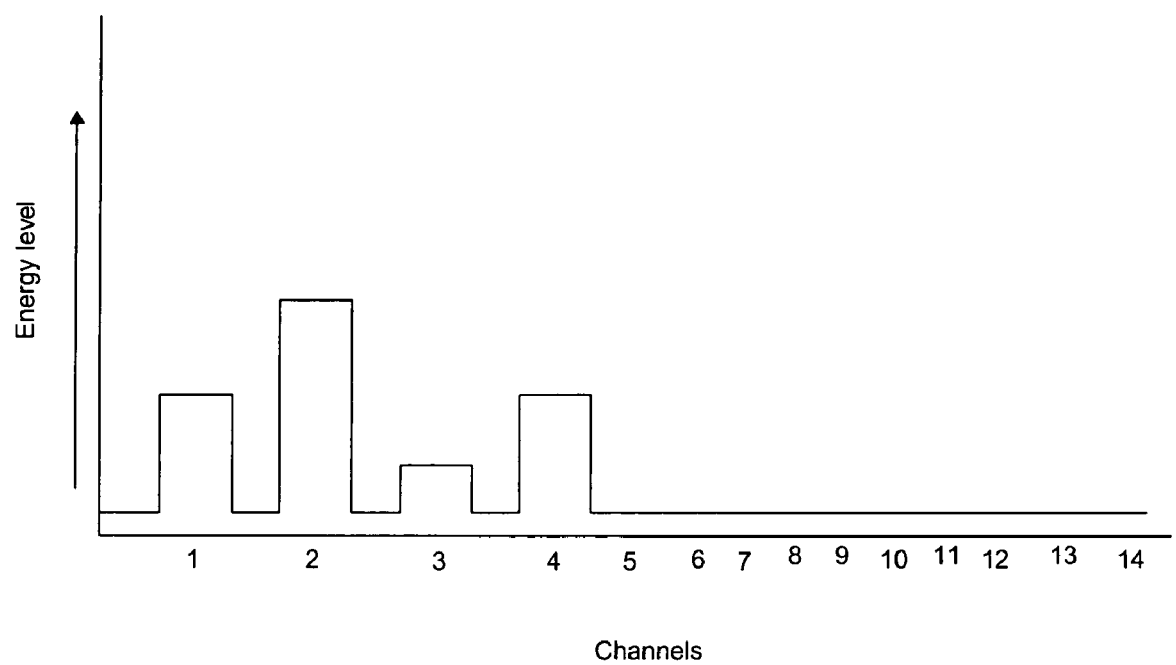
FIG. 3 shows an exemplary embodiment of a profile of an input signal according to the present invention.

In step 220, the AP 25 determines whether any of the energy levels are unexpected by, for example, comparing each energy level to a predetermined level. In one embodiment, the AP 25 may determine which of the channels are being utilized in the WLAN 30 (e.g., which bins have non-negligible/zero energy levels). For example, any non-zero energy level detected may indicate that a corresponding channel is being utilized. For example, as shown in FIG. 3, an exemplary embodiment of a profile 300 of the energy levels may indicate that the channels 1-4 are being used. That is, AP 25 is using channel 1, AP 40 is using channel 2, AP 45 is using channel 3 and the rogue AP 50 is using channel 4. However, those of skill in the art will understand that any number of the APs may be utilizing a same channel. For example, the rogue AP 50 may be utilizing the same channel as the AP 40, inhibiting data transfer and/or access to the network 20 for the AP 40. This may cause delay within the WLAN 30 and may compromise a security thereof.

In another embodiment, the AP 25 may compare the energy level in each bin to stored energy levels which have been previously recorded or a predetermined threshold level. In this manner, the AP 25 may identify those bins with energy levels different from (or within a predetermined range) of the stored energy levels or threshold level. When the energy level is not unexpected, the AP 25 may continue receiving and processing further input signals.

In step 225, the AP 25 executes a predetermined action to determine whether the detected energy level corresponds to any unauthorized activity. In one embodiment, the AP 25 may decrease a first time for which the IDS dwells on the channels which exhibit little or no activity (e.g., a negligible/zero energy level). For example, if the AP 25 has determined that the energy level on the channel 8 is low or zero, the AP 25 may decrease the first time. In this manner, the IDS may not waste time executing the IDS on the channel with little or no activity.

Alternatively or additionally, the AP 25 may increase a second time for which the IDS dwells on the channels which show activity (e.g., a non-negligible/zero energy level). In one embodiment, the AP 25 may compare the energy level on the channel to a predetermined value, and when the energy level is greater than the value, the AP 25 may increase the second time. In another embodiment, the AP 25 may increase the second time for any channel which shows any activity (i.e., any non-zero energy level). In a further embodiment, the AP 25 may increase the second time in a manner proportional to the energy level. That is, a higher the energy level, a greater the increase in the second time. In any embodiment, the increase in the second time may allow the IDS to decode more signals which increases a probability of detecting and identifying the unauthorized device (e.g., the rogue AP 50).

As understood by those of skill in the art, the IDS may decode the activity on the channel to which it is currently tuned. According to the present invention, the IDS may be tuned to the channels which exhibit the non-negligible energy levels. In this manner, a probability of early detection, identification and location of any unauthorized activity may be increased. That is, after executing the signal processing technique on the input signal, the portions of the input signal in the bins may be analyzed to determine whether they correspond to a predetermined signal signature. If the signal does not correspond to the signal signature, the AP 25 determines that the source of the signal is an unauthorized device (e.g., the rogue AP 50). The IDS may then decode the signal and identify the source by demodulating the signal and extracting an address data (e.g., MAC address) therein. A location of the source may then be determined using any conventional locationing technique (e.g., triangulation).

Figure 4:
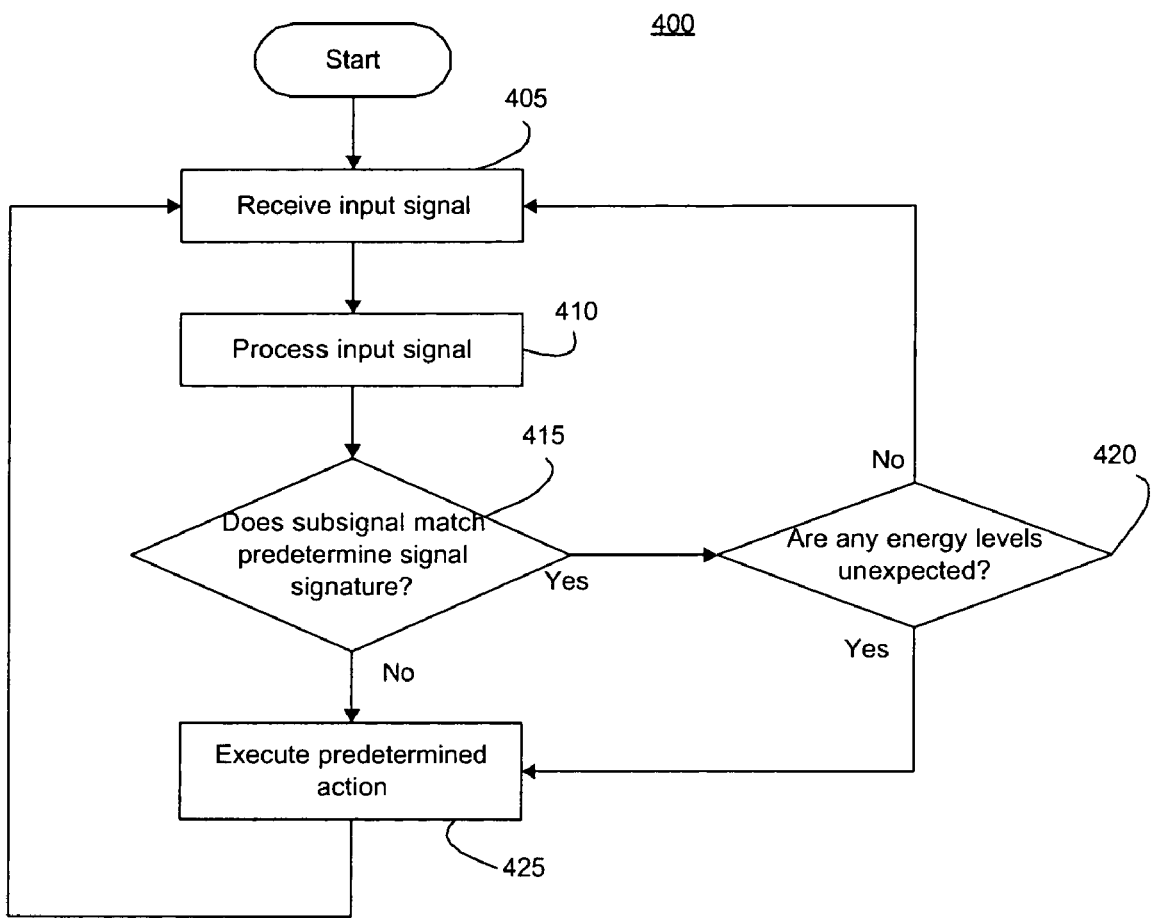
FIG. 4 shows an exemplary embodiment of another method according to the present invention.

An exemplary embodiment of an alternative method 400 is shown in FIG. 4. In steps 405 and 410, the input signal is received and processed, respectively, in a similar manner as described above with reference to the method 200. In step 415, the portions of the signal in each bin are analyzed to determine whether they match one or more predetermined signal signatures (e.g., 802.11). The signal signatures may be, for example, stored in a memory of the AP 25. If the portion of the signal matches one of the signal signatures, the AP 25 may determine the energy level thereof (step 420). That is, if the energy level is less than a predetermined threshold, the signal may represent normal 802.11 activity. However, if the energy level is above the threshold, the signal may represent activity of the rogue AP 50 or other unauthorized/malicious 802.11 device. As shown in step 425, when the signal does not fit a signal signature or the energy level is unexpected, the predetermined action is executed, which is described above. The method 400 further shows a recursive nature, because the AP 25 may continually receive and process the input signal.

In another embodiment, the IDS may be unable to decode the activity on the channel, because it is not formatted according to the predetermined wireless communication protocol. However, an inability to decode the activity may lead to an inference that the activity may have been generated by a device causing interference and/or corruption during operation of the WLAN 30. For example, a Bluetooth® device 65, a cordless speaker 60 and/or a cordless phone 55 may be transmitting on the channel.

From the above description, those of skill in the art will understand that the present invention provides an advantage of steering the IDS to the channel(s) which show activity. As described above, if the IDS can decode the signal on the channel, the source of the signal may be determined. When the source is known, it may be determined whether it is authorized. If unauthorized, the location may be determined and a corrective action may be executed (e.g., disabling). If the IDS cannot decode the signal, the inference may be made that the source may be causing interference/corruption during operation of the WLAN 30. Thus, a network administrator may take further action (e.g., determine and locate the source, disable, adjust power settings, etc.).

It will also be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
   receiving a wireless signal of a predetermined radio frequency band;
   processing the signal into a plurality of subsignals, each subsignal corresponding to a particular radio frequency channel of the band;
   determining an energy level of the corresponding subsignal; and
   when the energy level is greater than a predetermined level, analyzing the corresponding channel, wherein the analyzing step includes the following substep: modifying a time period as a function of the energy level, the time period being a time for which an intrusion detection system is tuned to the corresponding channel, the intrusion detection system determining a source device of the subsignal.

2. The method of claim 1, further comprising: determining whether the corresponding subsignal matches a predetermined signal signature, the signature indicative of a wireless signal transmitted by a particular electronic device.

3. The method of claim 1, wherein the band is one of a 2.4 GHz band and a 5.1 GHz band.

4. The method of claim 1, wherein the wireless signal has a predetermined width of one of 20 MHz and 80 MHz.

5. The method of claim 1, wherein the processing step is performed using a Fast Fourier Transform.

6. The method of claim 1, wherein the determining step includes the following sub step: analyzing an amplitude of the corresponding signal to generate data indicative of the energy level.

7. The method of claim 1, wherein the modifying step includes the following substep: when the source device is an unauthorized device, increasing the time.

8. The method of claim 1, further comprising: identifying a location of the source device.

9. A system, comprising:
   a plurality of electronic devices transmitting wireless signals on a predetermined radio frequency band; and
   an access point receiving the signals, the access point processing the signals into a plurality of subsignals, each sub signal corresponding to a particular radio frequency channel of the band, the access point determining an energy level of the corresponding subsignal, wherein, when the energy level is greater than a predetermined level, the access point analyzes the corresponding channel, wherein the access point modifies a time for which an intrusion detection system of the access point is tuned to the corresponding channel as a function of the energy level, the intrusion detection system determining a source device of the subsignal.

10. The system of claim 9, wherein the electronic devices include at least one of a cell phone, a laptop, a network interface card, an image-based scanner, a laser-based scanner, an RFID tag, an RFID reader and a rogue AP.

11. The system of claim 9, wherein the access point determines whether the corresponding subsignal matches a predetermined signal signature, the signature indicative of a wireless signal transmitted by one of the portable electronic devices.

12. The system of claim 9, wherein the band is one of a 2.4 GHz band and a 5.1 GHz band.

13. The system of claim 9, wherein the signals are processed using a Fast Fourier Transform.

14. The system of claim 9, wherein the access point analyzes an amplitude of the corresponding signal to generate data indicative of the energy level.

15. The system of claim 9, wherein the access point identifies a location of the source device.

16. An arrangement, comprising:
   a memory storing a predetermined level;
   a communication arrangement receiving a wireless signal of a predetermined radio frequency band; and
   a processor processing the signal into a plurality of subsignals, each subsignal corresponding to a particular radio frequency channel of the band, the processor determining an energy level of the corresponding sub signal, wherein, when the energy level is greater than a predetermined level, the processor analyzes the corresponding channel, wherein the processor modifies a time for which an intrusion detection system is tuned to the corresponding channel as a function of the energy level, the intrusion detection system determining a source device of the subsignal.

17. The arrangement of claim 16, wherein the processor determines whether the corresponding subsignal matches a predetermined signal signature stored in the memory, the signature indicative of a wireless signal transmitted by a particular electronic device.

18. The arrangement of claim 16, wherein the band is one of a 2.4 GHz band and a 5.1 GHz band.

19. The arrangement of claim 16, wherein the signal is processed using a Fast Fourier Transform.

20. The arrangement of claim 16, wherein the processor analyzes an amplitude of the corresponding signal to generate data indicative of the energy level.

21. The arrangement of claim 16, wherein the processor identifies a location of the source device.

* * * * *